United States Patent [19]

Okabe

[11] 4,309,605
[45] Jan. 5, 1982

[54] PHOTO-REFLECTIVE SENSOR

[75] Inventor: Tadatoshi Okabe, Hanno, Japan

[73] Assignee: New Japan Radio Co., Ltd., Tokyo, Japan

[21] Appl. No.: 81,121

[22] Filed: Oct. 2, 1979

[51] Int. Cl.³ .............................................. H01J 5/02
[52] U.S. Cl. .................................. 250/239; 250/552
[58] Field of Search ........... 250/239, 551, 552, 211 J; 357/19

[56] References Cited

U.S. PATENT DOCUMENTS

| | | | |
|---|---|---|---|
| 3,842,263 | 10/1974 | Kornrumpf et al. | 250/552 |
| 4,040,078 | 8/1977 | Eckton et al. | 357/19 |
| 4,182,977 | 1/1980 | Stricklin | 250/239 |

*Primary Examiner*—David C. Nelms
*Attorney, Agent, or Firm*—Armstrong, Nikaido, Marmelstein & Kubovcik

[57] ABSTRACT

A photo-reflective sensor comprising a light-emitting element and a light-detecting element adapted to receive the light from the light-emitting element after the light has been reflected from an article to be detected as modulated by a variation in the reflectance of the article. The sensor is characterized in that it is fabricated by molding a light-blocking wall portion, an outer case portion and a lead wire fixing portion integrally from an insulating base material to form a header, fixing chip lead wires and internal wiring lead wires to the header to form a stem, placing a photo-emitting chip and a photo-detecting chip on the chip lead wires and connecting the chips to the internal wiring lead wires to form the light-emitting and light-detecting elements. The sensor can be manufactured in a small size, by a reduced number of assembly steps and with improved light-blocking characteristics.

5 Claims, 16 Drawing Figures

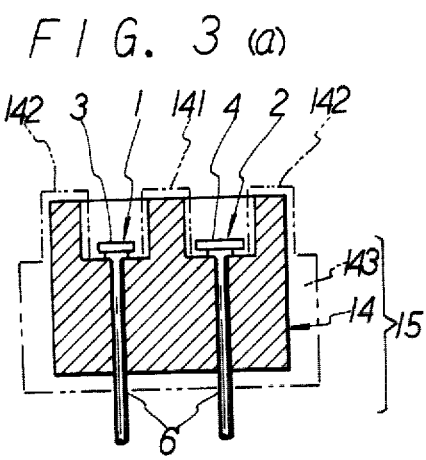
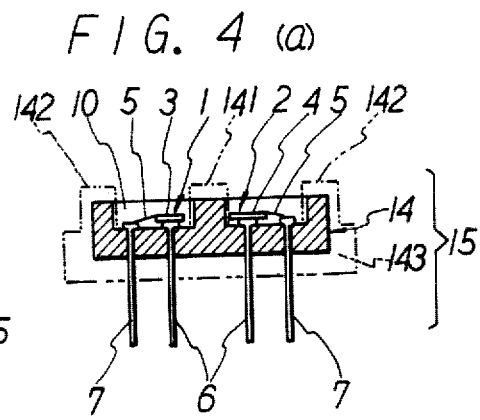
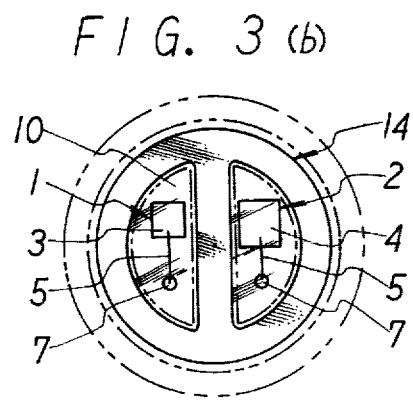
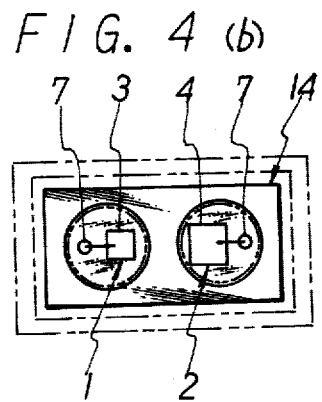
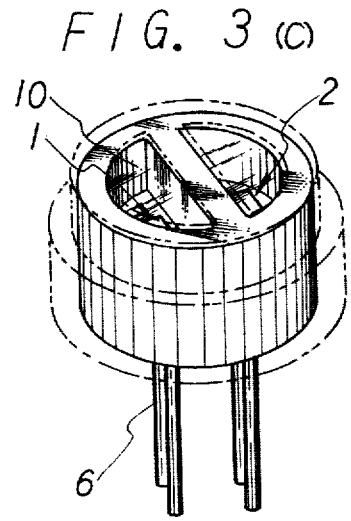
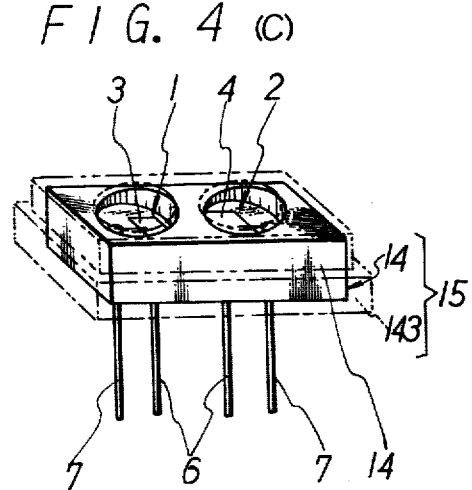

PHOTO-REFLECTIVE SENSOR

BACKGROUND OF THE INVENTION

The present invention relates to a novel photo-reflective sensor, and more particularly to improvements in a photo-reflective sensor in which the light emitted from a light-emitting element is modulated by a variation in the reflectance of an article to be detected and the modulated reflected light is received by a light-detecting element.

Photoelectric converter elements are used in recent years for detecting values which alter from moment to moment, for example, for controlling the number of revolutions of motors or for use in speed alarms for motor vehicles. These sensors are divided into two types: photo-interrupter sensors which comprise a light-emitting element and a light-detecting element opposed thereto to provide a light path so that an article to be detected, when blocking the light path, is detected by the light-detecting element, and photo-reflective sensors which comprise a light-emitting element and a light-detecting element disposed in the same direction as the light-emitting element and adapted to receive the light emitted therefrom as modulated by and reflected from an article to be detected. Because the photo-reflective sensor has a simple construction and can be compacted, sensors of this type have found wide use in peripheral units of electronic computers, such as card readers and readers for characters and diagrams, tacho-generators and control units for controlling the speed of rotation of motors, for example, for sound systems and tape recorders.

FIGS. 1 and 2 show such photo-reflective sensors. The sensor shown in FIGS. 1 (a) and 1 (b) includes a light-emitting element 1 and a light-detecting element 2. The light-emitting element 1 is produced by preparing a header 8 having an upper recess in the form of an inverted truncated pyramid, fixing a lead wires 6 to the header 8, attaching a light-emitting chip 3 to the lead wire 6 by die-bonding (i.e. bonding at an elevated temperature with use of a eutectic solder, an electroconductive epoxy resin adhesive or the like), connecting an internal lead wire 7 to the bonding pad of the chip 3 with a fine gold wire 5 by wire-bonding (i.e. bonding with application of heat and pressure, or ultrasonic bonding), filling a transparent resin 10 in the recess for protecting the chip 3 and gold wire 5 and solidifying the resin 10. The light-detecting element 2, comprising a light-detecting chip 4, is fabricated in the same manner as the element 1. The elements 1 and 2 are accommodated in a container 9 and bonded thereto with a synthetic resin.

The sensor shown in FIGS. 2 (a) and 2 (b) is fabricated by attaching a light-emitting chip 3 and a light-detecting chip 4 to a header 11, for example, of the TO-72 type having four lead wires 6 and 7 with the die-bonding of the chips to the wires 6 and the wire-bonding of the chips to the wires 7, fixing a case 13 having a light-blocking wall 12 to the header 11 as seen in FIG. 2 (a), filling the recesses of the case 13 with a transparent synthetic resin 10 and solidifying the resin as seen in FIG. 2 (b).

The photo-reflective sensor shown in FIG. 1 (b) requires an increased number of assembly steps and is therefore costly, since the light-emitting element 1 and the light-detecting element 2 are produced individually and the elements 1 and 2 are thereafter installed in the container 9. Moreover there is a limitation on the compaction of the sensor, while the difficulty encountered in positioning the elements 1 and 2 impairs the characteristics of the sensor.

The sensor shown in FIG. 2 (b) in which the header 11 and the case 13 are not integral similarly requires an increased number of assembly steps and is costly to make, while failing to have the desired light-blocking properties due to the presence of a clearance between the header and the case. Consequently the sensor has poor characteristics. Further with the construction of FIG. 2 (b) in which the case 13 is attached to the separate header 11, it is very difficult to diminish the diameter of the sensor to less than 5.45 mm. This imposes a limitation on compaction.

With the recent trend that electric parts are incorporated into integrated circuits with an ever increasing density, there is a tendency to provide electric devices in smaller sizes as well as the compaction of motors. It is nevertheless difficult to use conventional photo-reflective sensors for controlling the speed of compacted motors of reduced size because minimum diameter of the sensors is 5.45 mm. and can not be made smaller. Thus it is impossible to incorporate such a sensor into a small-sized motor having a clearance of only about 3 mm., for example.

OBJECTS OF THE INVENTION

An object of the invention is to provide a photo-reflective sensor which has a reduced size and improved characteristics such as improved light-blocking properties and which can be assembled by a reduced number of steps, with high accuracy and at a low cost.

Another object of the invention is to provide a photo-reflective sensor of reduced size which can be installed even in a limited space.

Another object of the invention is to provide a photo-reflective sensor having lead wires which are all arranged in line so as to be easily bendable for installation and also to be easily straightened during manufacture or to facilitate the test of the sensor in the final stage of manufacture.

Another object of the invention is to provide a photo-reflective sensor which is given improved reliability by overcoming the conventional problem that a transparent synthetic resin filled for protecting the chips and gold wires is liable to separate off to break the gold wires.

These and other objects of the invention will become apparent from the following description with reference to the accompanying drawings.

BRIEF DESCRIPTION OF THE DRAWINGS

FIGS. 3 (a) to 3 (c) show a photo-reflective sensor embodying the invention, FIG. 3 (a) being a view in vertical section, FIG. 3 (b) being a plan view, and FIG. 3 (c) being a perspective view;

FIGS. 4 (a) to 4 (c) show another embodiment of the invention, FIG. 4 (a) being a view in vertical section, FIG. 4 (b) being a plan view, and FIG. 4 (c) being a perspective view;

DETAILED DESCRIPTION

Figure 1A:
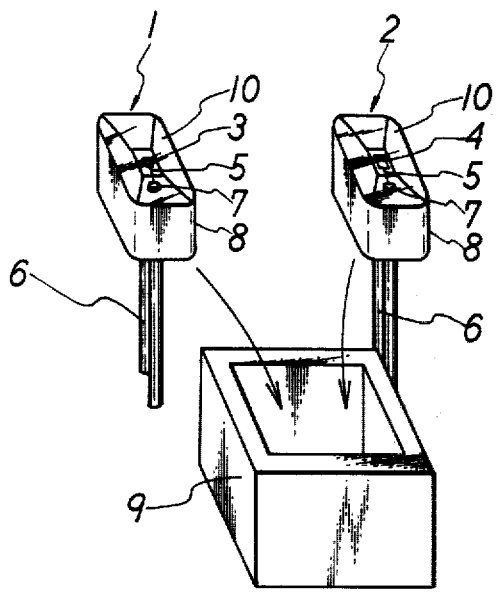
FIGS. 1 (a) and 1 (b) show a conventional photo-reflective sensor, FIG. 1 (a) being an exploded perspective view showing the assembly order of the same, and FIG. 1 (b) being a perspective view showing the sensor assembled in the order of FIG. 1 (a)

The present invention provides a photo-reflective sensor having a light-emitting element, a light-detecting element, and a light-blocking wall and an outer case for preventing leakage of light from the light-emitting element, the light-detecting element being adapted to receive the light from the light-emitting element after the light has been reflected from an article to be detected as modulated by a variation in the reflectance of the article, the photo-reflective sensor being characterized in that the sensor is fabricated by:

(a) molding a light-blocking wall portion, an outer case portion and a lead wire fixing portion integrally from an insulating base material to form a header, and fixing chip lead wires and internal wiring lead wires to the header to form a stem, and (b) placing a photo-emitting chip and a photo-detecting chip on the chip lead wires of the stem and connecting the chips to the internal wiring lead wires to form the light-emitting element and the light-detecting element.

The preferred embodiments of this invention will be described below with reference to the drawings, in which like parts are referred to by like reference numerals.

FIGS. 3 (a) to 3 (c) show a light-emitting element 1, light-detecting element 2, light-emitting chip 3, light-detecting chip 4, gold wires 5, lead wires 6 for supporting the chips 3 and 4, lead wires 7 for internal wiring, header 14 and stem 15.

The header 14 is made of an insulating base material, such as glass, ceramics, glazed ceramics or synthetic resin, which has a color capable of blocking the light of particular wavelength emitted from the light-emitting chip 3. The header 14 comprises a light-blocking wall 141 for preventing the light from the light-emitting element 1 from directly striking the light-detecting element 2, an outer case 142 for preventing leakage of the light and a portion 143 for fixing the lead wires 6 and 7. The wall 141, outer case 142 and fixing portion 143 are molded integrally from the base material with use of a die or mold.

The lead wires 6 for supporting the chips 3 and 4 and internal wiring lead wires 7 are fixed to the header 14 as with glass to provide stem 15.

Subsequently the light-emitting chip 3 and the light-detecting chip 4 are bonded to the lead wires 6 in the stem 15 by means of die-bonding, and the bonding pads of the chips 3 and 4 are connected to the lead wires 7 with fine gold wires 5 by wire-bonding. The recesses defined by the light-blocking wall 141 and the outer case 142 are then filled with a transparent resin 10, whereby a photo-reflective sensor is completed.

With reference to FIGS. 3 (b) and 3 (c), the sensor has the light-emitting element 1 in one semicircular portion to which the chip 3 is attached and the light-detecting element 2 in the other semicircular portion to which the chip 4 is attached.

The photo-reflective sensor of this invention, for which a die or mold is usable, can be produced in large quantities with ease and at a low cost. Since the lead wires can be positioned in the stem 15 with high accuracy, the light-emitting chip 3 and the light-detecting chip 4 can be positioned with improved accuracy relative to each other. It is therefore very easy to provide the sensor in a small size and, nevertheless, with outstanding characteristics. Additionally the sensor can be manufactured with use of a die or mold which can be prepared as desired in accordance with the size and shape of the header 14. For instance, the header 14 can be as small as about 4 mm. in outside diameter. The light-blocking wall which is an integral part of the header completely blocks direct passage of light from the light-emitting element to the light-detecting element. Whereas it is conventionally necessary to attach a separate light-blocking wall to the header, or to individually prepare the light-emitting and light-detecting elements and to fit the elements in a case for assembly, the sensor of this invention does not require such a procedure and can therefore be manufactured by a greatly reduced number of assembly steps.

The photo-reflective sensor of the shape shown in FIGS. 3 (a) to 3 (c), although having the foregoing advantages, is limited to about 4 mm. in outside diameter if smallest. The sensor of this type in which the four lead wires are arranged in the corners of a square when it is seen in cross section is not fully usable in limited spaces. When desired to meet the requirements involved, accordingly, the sensor of this invention can be produced in a laterally elongated shape of reduced thickness because the contours of the header can be defined as desired with use of a die or mold as already described. It is possible to manufacture a sensor of reduced size, for example, of 2.54 mm. in thickness and 6 mm. in length, as will be described below with reference to FIGS. 4 to 7.

With reference to FIGS. 4 (a) to 4 (c), a stem 15 has lead wires 6 and 7 arranged in line and fixed to a header 14. The two lead wires 6 for mounting chips are disposed close to each other, with the two lead wires 7 for internal wiring positioned at opposite ends of the header. Accordingly the sensor may be larger in width than the sensor of FIGS. 3 but can be reduced to 2.54 mm. in thickness with taking the thickness of the chips and the thickness of an outer case 142 into consideration. Chips 3 and 4 are bonded to the lead wires 6 and connected to the lead wires 7 with use of gold wires 5. The recesses in the stem 15 are then filled with transparent resin 10 to completely fabricate the sensor.

Figure 2A:
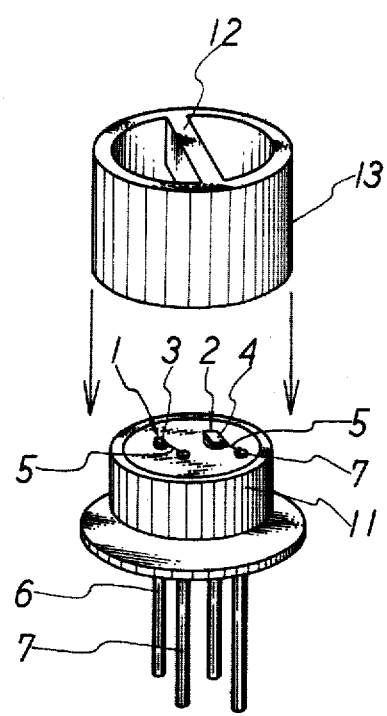
FIGS. 2 (a) and 2 (b) show another conventional photo-reflective sensor, FIG. 2 (a) being an exploded perspective view showing the assembly order of the same, and FIG. 2 (b) being a perspective view showing the sensor assembled in the order of FIG. 2 (a)
Figure 1B:
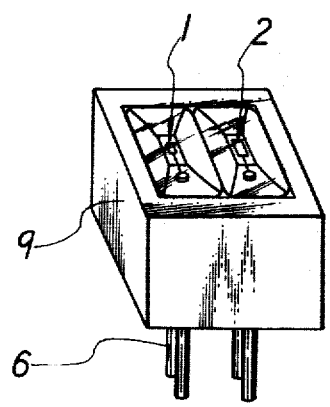
Figure 2B:
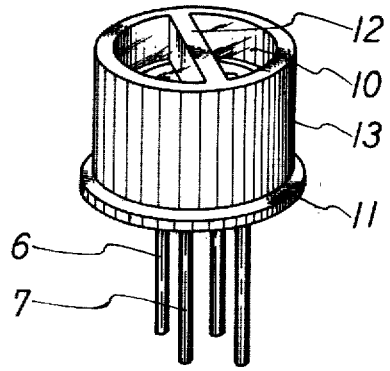
Figure 5A:
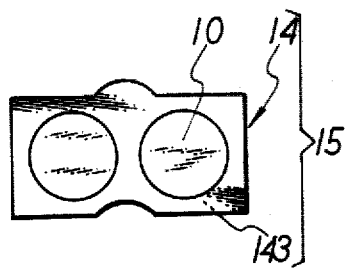
FIGS. 5 (a) to 5 (d) are plan views showing other embodiments of the invention.
Figure 5B:
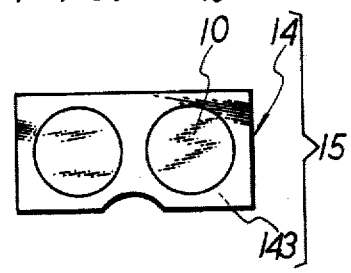
Figure 5C:
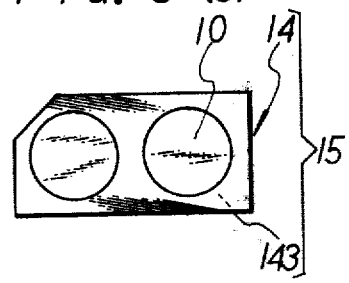
Figure 5D:
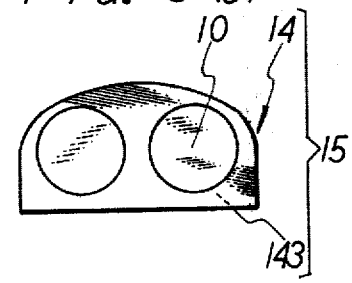

Since the photo-reflective sensor shown in FIGS. 4 (a) to 4 (c) have the four lead wires arranged in line, the lead wires can be straightened with ease during manufacture, and the product can be tested easily in the final stage of manufacture. The alignment of the wires also facilitates automation of such procedures. Stated more specifically, the lead wires of the conventional sensor shown in FIGS. 2 (a) and 2 (b) must be straightened in at least two directions, but the aligned lead wires need only to be straightened in one direction. In the final stage of manufacture, the above-mentioned conventional sensor cannot be tested unless the four lead wires are inserted in a socket by a difficult and cumbersome procedure, which requires a complex apparatus and a prolonged period of time when automation is contemplated. The product is therefore costly. On the other hand, the present embodiment having the aligned lead wires can be tested with use of testing electrodes which are adapted to clamp the lead wires on opposite sides thereof. Thus the test can be performed automatically easily with a reduced number of steps and at a lower cost. Furthermore, the photo-reflective sensors of FIGS. 1 and 2 are very inconvenient to install because when the element bearing surface of the sensor is positioned at a right angle with the plane of a print base panel, the lead wires are likely to contact each other if bent. In contrast, the present embodiment is very convenient to use even in such arrangement because the lead wires are arranged in line. The sensors of the type shown in FIGS. 4 (a) to 4 (c), which are rectangular, can be transported or stored conveniently as stacked in layers, while the stacked sensors can be easily tested one after another and are convenient to arrange for installation since the row of the lead wires are in parallel with the side wall surfaces.

FIGS. 5 (a) to 5 (c) show other embodiments each of which is substantially similar to the sensor of FIGS. 4 (a) to 4 (c) but has an altered shape for the identification of orientation so that the sensors can be stacked in a given orientation for the distinction of the two kinds of the elements from each other. The sensors may be shaped as shown in FIG. 5 (d) when there is no need to stack up the sensors. Alternatively for the identification of orientation, the sensor may be provided with a particular lead wire having an altered thickness or arranged in an altered position relative to the stem, or may bear a mark on the stem or a lead wire.

Figure 6:
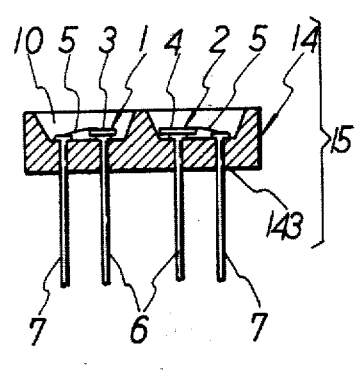
FIG. 6 is a view in vertical section showing another embodiment of the invention.
Figure 7:
FIG. 7 is a plan view showing a piece of transparent resin 10 of FIG. 2 (b) to illustrate the directions in which forces act to expand and contract the resin piece.

As seen in FIG. 6, the recesses defined by the light-blocking wall 141 and the outer case 142 may be tapered toward the bottom of the header.

With the sensors of FIGS. 4 and 5, the recesses defined by the light-blocking wall and the outer case are all circular. The recesses having a circular, elliptical or like smoothly curved shape when seen in cross section or plan view are advantageous over the recess of semi-circular shape shown in FIG. 2 (b) and having sharply bent portions in that the transparent resin piece, when subjected to variations in temperature or humidity, is less prone to separation which would lead to a break of the gold wire. When the transparent resin piece 10 is semicircular as seen in FIG. 2, forces will act on the straight portion of the semicircular piece in the directions of arrows in FIG. 7 to deform the straight portion to a curved form, possibly separating the resin piece 10 off the place. Thus unlike the recess of semicircular shape including the sharply bent portions defined by a circular arc and a straight line, recesses of circular or elliptical shape having no sharply bent portions will not cause separation of the transparent resin piece and are therefore desirable in giving improved reliability to the photo-reflective sensor. However, this is not a critical requirement. The photo-reflective sensor of this invention has the advantage that the header can be shaped by a die or mold to the desired contours having no sharply bent portions.

In addition to the arrangement of the lead wires as shown in FIGS. 3 (a) to 3 (c), FIGS. 4 (a) to 4 (c) and FIG. 6, the lead wires may also be arranged in at least two longitudinal rows and/or at least two transverse rows.

Although the present invention has been described above with reference to the foregoing specific embodiments, the invention is not limited to these embodiments but can be modified by one skilled in the art without departing from the spirit of the invention.

What is claimed is:

1. A method for preparing a photo-reflective sensor which comprises the steps of
   (a) integrally molding a light-blocking wall portion, an outer case portion and a lead wire fixing portion from an insulating base material to form a header in which the light-blocking wall portion and the outer case portion are positioned on the lead wire fixing portion to provide two recesses, said insulating base material being a member selected from the group consisting of glass, ceramics and glazed ceramics and having a color capable of blocking the light of a particular wavelength,
   (b) fixing a plurality of lead wires to the header to form a stem,
   (c) die-bonding a light-emitting chip to one of two lead wires in one recess and a light-detecting chip to one of two lead wires in the other recess,
   (d) wire-bonding each of the die-bonded light-emitting chip and light-detecting chip to the other lead wire in each recess to form a light-emitting element and a light-detecting element, and
   (e) filling the recesses with a transparent resin.

2. The method as claimed in claim 1, wherein the lead wires are arranged in at least one longitudinal row.

3. The method as claimed in claim 1, wherein the lead wires are arranged in line, and the header has a plane substantially parallel to the line of the lead wires.

4. The method as claimed in claim 1, wherein the stem has an identifying feature for the identification of orientation.

5. The method as claimed in claim 1, wherein the recesses of the header extend vertically, are generally circular in cross-section, and taper inwardly toward the bottom of the recesses.

* * * * *